United States Patent
Sakaguchi

(10) Patent No.: US 11,798,421 B2
(45) Date of Patent: *Oct. 24, 2023

(54) AUTONOMOUS DRIVING DEVICE

(71) Applicant: TOYOTA JIDOSHA KABUSHIKI KAISHA, Toyota (JP)

(72) Inventor: Eiji Sakaguchi, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,261

(22) Filed: Nov. 5, 2021

(65) Prior Publication Data
US 2022/0058951 A1    Feb. 24, 2022

Related U.S. Application Data

(63) Continuation of application No. 17/325,901, filed on May 20, 2021, which is a continuation of application
(Continued)

(30) Foreign Application Priority Data

Nov. 6, 2017    (JP) ................. 2017-213894

(51) Int. Cl.
*G08G 1/16* (2006.01)
*B60W 30/18* (2012.01)
*G08G 1/052* (2006.01)

(52) U.S. Cl.
CPC ....... *G08G 1/167* (2013.01); *B60W 30/18163* (2013.01); *G08G 1/052* (2013.01); *G08G 1/166* (2013.01); *B60W 2554/80* (2020.02)

(58) Field of Classification Search
CPC ........ G08G 1/167; G08G 1/052; G08G 1/166; B60W 30/18163; B60W 2554/80
(Continued)

(56) References Cited

U.S. PATENT DOCUMENTS 8,682,511 B2 *  3/2014  Andreasson ............ B61L 23/34
                                                       701/19
9,340,207 B2    5/2016  Nagasaka et al.
(Continued)

FOREIGN PATENT DOCUMENTS

JP    H1186192 A       3/1999
JP    2011-028630 A    2/2011
(Continued)

OTHER PUBLICATIONS

English Translation for JPH1186192A.
(Continued)

*Primary Examiner* — Mahmoud S Ismail
(74) *Attorney, Agent, or Firm* — Sughrue Mion, PLLC

(57) ABSTRACT

An autonomous driving device 100 is configured to set a target route to merge into a first main line L11 from a branch line L20 based on waypoints P set in a lane. If it is determined by the merge determination unit 14 that the merge is not easy, the target route setting unit 15 is configured to select the waypoint P on the branch line L20 set at the position on an end edge E side of the branch line L20 as the end edge waypoint Pa closest to the end edge E side on the branch line L20 to be selected for setting the target route, compared to a case where it is determined that the merge is easy.

9 Claims, 7 Drawing Sheets

Related U.S. Application Data

No. 16/154,894, filed on Oct. 9, 2018, now Pat. No. 11,043,127.

(58) Field of Classification Search
USPC .......................................................... 701/23
See application file for complete search history.

(56) References Cited

U.S. PATENT DOCUMENTS

| | | | |
|---|---|---|---|
| 9,475,491 | B1 | 10/2016 | Nagasaka et al. |
| 10,146,223 | B1* | 12/2018 | Luders ................. G05D 1/0088 |
| 11,043,127 | B2 | 6/2021 | Sakaguchi |
| 2005/0015203 | A1* | 1/2005 | Nishira ................. B60W 50/16 340/436 |
| 2009/0060647 | A1* | 3/2009 | Denison .................... E01C 1/02 404/1 |
| 2011/0054793 | A1 | 3/2011 | Harada et al. |
| 2016/0334796 | A1* | 11/2016 | Inoue ................. G01C 21/3644 |
| 2017/0088144 | A1* | 3/2017 | Shibata ............ G08G 1/096758 |
| 2017/0089717 | A1* | 3/2017 | White .................. G08G 1/0112 |
| 2017/0320521 | A1 | 11/2017 | Fujita |
| 2017/0329338 | A1* | 11/2017 | Wei ..................... B60W 30/095 |
| 2018/0118223 | A1* | 5/2018 | Mori ..................... B60W 40/04 |
| 2019/0039627 | A1* | 2/2019 | Yamamoto ........ B60W 60/0053 |
| 2019/0139415 | A1 | 5/2019 | Sakaguchi |
| 2021/0327277 | A1 | 10/2021 | Sakaguchi |
| 2022/0058951 | A1 | 2/2022 | Sakaguchi |

FOREIGN PATENT DOCUMENTS

| | | |
|---|---|---|
| JP | 2011-048470 A | 3/2011 |
| JP | 2012-123606 A | 6/2012 |
| JP | 2016017914 A | 2/2016 |
| JP | 2016-215733 A | 12/2016 |
| JP | 2016210380 A | 12/2016 |
| JP | 2017083950 A | 5/2017 |
| WO | 2016063383 A1 | 4/2016 |

OTHER PUBLICATIONS

United States Office Action dated Jan. 12, 2023 in U.S. Appl. No. 17/325,901.

Office Action dated Apr. 21, 2023 issued in U.S. Appl. No. 18/089,769.

Notice of Allowance issued to U.S. Appl. No. 17/325,901 dated Feb. 15, 2023.

Office Action dated Jun. 30, 2023 issued in U.S. Appl. No. 18/089,769.

\* cited by examiner

*Fig.5*

|  | | SIZE OF OTHER VEHICLE | |
|---|---|---|---|
|  | | PASSENGER CAR MOTORCYCLE | TRUCK |
| SIZE OF HOST VEHICLE | PASSENGER CAR MOTORCYCLE | A | B |
|  | TRUCK | B | C |

AUTONOMOUS DRIVING DEVICE

CROSS-REFERENCE TO RELATED APPLICATION

This application is a continuation of U.S. application Ser. No. 17/325,901 filed May 20, 2021, which is a continuation of U.S. application Ser. No. 16/154,894 filed Oct. 9, 2018 (now U.S. Pat. No. 11,043,127 issued Jun. 22, 2021), which claims the benefit of priority from Japanese Patent Application No. 2017-213894, filed on Nov. 6, 2017. The entire disclosures of the prior applications are considered part of the disclosure of the accompanying continuation application, and are hereby incorporated by reference.

TECHNICAL FIELD

The present disclosure relates to an autonomous driving device.

BACKGROUND

For example, in Japanese Patent Application No. 2016-210380, an autonomous driving device that causes a host vehicle to autonomously travel based on a travel plan for the host vehicle traveling on a branch line to merge into a main line is disclosed. This autonomous driving device generates the travel plan in which a timing of merging into the main line changes according to the presence or absence of following vehicles traveling behind the host vehicle.

SUMMARY

When the host vehicle merges into the main line from the branch line, if merging into the main line is not easy such as when the main line is congested, this may cause a congestion to the following vehicles traveling on the branch line. Therefore, in this technical field, it is desirable to suppress the congestion of the following vehicles traveling on the branch line even if it is not easy to merge into the main line.

According to an aspect of the present disclosure, there is provided an autonomous driving device configured to set a target route for a host vehicle to merge into a main line from a branch line toward a destination set in advance based on map information in which a plurality of waypoints are set in advance in a lane along an extending direction of the lane, and to cause the host vehicle to travel along the set target route, the device comprising: a vehicle position recognition unit configured to recognize a position of the host vehicle on the map; a target route setting unit configured to select the waypoint from the plurality of waypoints, through which the host vehicle passes when merging into the main line from the branch line toward the destination based on the map information, the position of the host vehicle on the map recognized by the vehicle position recognition unit, and the destination, and to set the target route such that the host vehicle passes through the selected waypoint; an external situation recognition unit configured to recognize a travel situation of another vehicle traveling around the host vehicle on the main line if the host vehicle is traveling on the branch line; a merge determination unit configured to determine whether or not the merge into the main line from the branch line is easy according to a determination criteria set in advance based on the travel situation of the other vehicle traveling on the main line recognized by the external situation recognition unit; and a vehicle control unit configured to cause the host vehicle to autonomously travel along the target route set by the target route setting unit. If it is determined by the merge determination unit that the merge is not easy, the target route setting unit is configured to select the waypoint set at the position on an end edge side of the branch line as the waypoint closest to the end edge side on the branch line to be selected for setting the target route, compared to a case where it is determined that the merge is easy.

In the autonomous driving device, if it is not easy to merge into the main line, the target route is set, which causes the host vehicle to merge into the main line after traveling to the position closer to the end edge on the branch line compared to a case where the merge is easy. That is, if it is not easy to merge into the main line, the autonomous driving device causes the host vehicle to travel to a position closer to the end edge on the branch line compared to the case where the merge is easy. In this way, a space can be provided behind the host vehicle on the branch line. The following vehicle can travel in the space provided behind the host vehicle on the branch line. Therefore, even if it is not easy to merge into the main line, the autonomous driving device can suppress the congestion due to the following vehicles traveling on the branch line.

In the autonomous driving device, as the waypoint positioned closest to the end edge side of the branch line to be selected when it is determined by the merge determination unit that the merge is not easy, if the vehicle size of the host vehicle is small, the target route setting unit may select the waypoint set at the position at the end edge side of the branch line compared to a case where the vehicle size of the host vehicle is large. That is, if the vehicle size of the host vehicle is small, the autonomous driving device can cause the host vehicle to travel to a position closer to the end edge of the branch line compared to a case where the vehicle size of the host vehicle is large. As described above, the autonomous driving device can change the distance for traveling on the branch line according to the vehicle size of the host vehicle.

In the autonomous driving device, as the waypoint positioned closest to the end edge side on the branch line to be selected when it is determined by the merge determination unit that the merge is not easy, if the vehicle size of the other vehicle traveling on the main line is small, the target route setting unit may select the waypoint set at the position on the end edge side of the branch line compared to the case where the vehicle size of the other vehicle is large. That is, if the vehicle size of the other vehicle traveling on the main line is small, the autonomous driving device can cause the host vehicle to travel to a position closer to the end edge of the branch line compared to the case where the vehicle size of the other vehicle is large. As described above, the autonomous driving device can change the distance for traveling on the branch line according to the vehicle size of the other vehicle.

In the autonomous driving device, as the waypoint positioned closest to the end edge side on the branch line to be selected when it is determined by the merge determination unit that the merge is not easy, if the speed of other vehicle traveling on the main line is high, the target route setting unit may be configured to select the waypoint set at the position on the end edge side of the branch line compared to the case where the speed of other vehicle is low. That is, if the speed of other vehicle traveling on the main line is high, the autonomous driving device can cause the host vehicle to travel to a position closer to the end edge of the branch line compared to the case where the speed of other vehicle is low. As described above, the autonomous driving device can change the distance for traveling on the branch line according to the speed of the other vehicle. For example, if the speed of the other vehicle is high, the distance for the host vehicle to travel on the branch line becomes long. In this case, the autonomous driving device can appropriately accelerate the host vehicle up to, for example, the speed of the other vehicle.

According to the present disclosure, even if it is not easy to merge into the main line, it is possible to suppress the congestion of the following vehicles traveling on the branch line.

BRIEF DESCRIPTION OF THE DRAWINGS

FIG. 5 illustrates a class classification table for classifying the vehicle according to a vehicle size.

DETAILED DESCRIPTION

Figure 1:
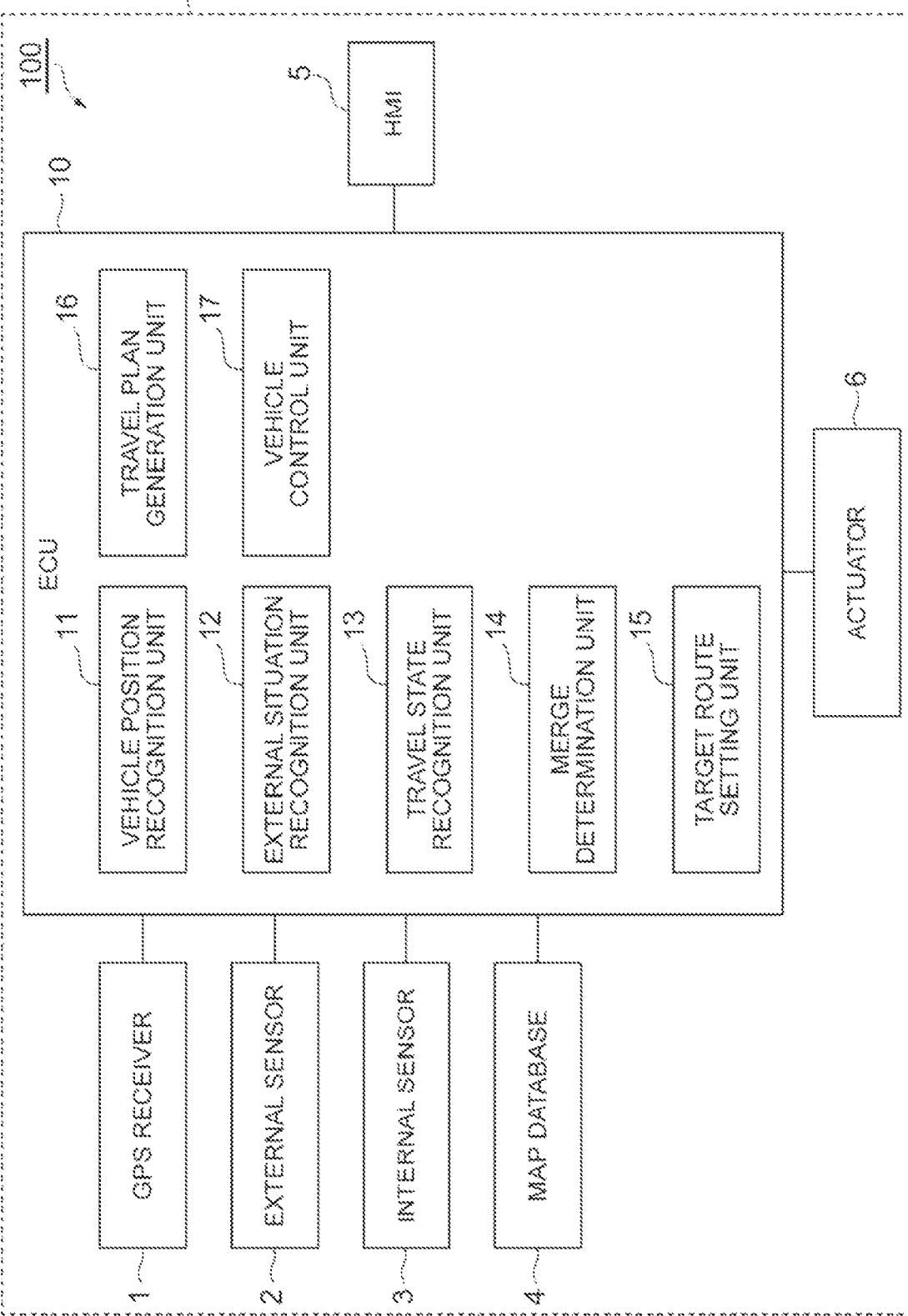
FIG. 1 is a diagram illustrating a schematic configuration of an autonomous driving device according to an embodiment.

Hereinafter, the embodiment of the present disclosure will be described with reference to the drawings. In the description of the drawings, the same reference numerals will be given to the same elements, and the descriptions thereof will not be repeated.

An autonomous driving device 100 illustrated in FIG. 1 is mounted on a host vehicle V such as a passenger car, and performs an autonomous driving control of the host vehicle V. The autonomous driving device 100 starts the autonomous driving control of the host vehicle V when a start operation (such as pressing a start button for starting the autonomous driving) for the autonomous driving control is performed by the occupant.

The autonomous driving control is a vehicle control that causes the host vehicle V to autonomously travel toward a destination set in advance. In the autonomous driving control, the driver does not need to perform a driving operation, and the host vehicle V travels autonomously.

As illustrated in FIG. 1, the autonomous driving device 100 includes an electronic control unit (ECU) 10 that performs overall management of the system. The ECU 10 is an electronic control unit including a central processing unit (CPU), read only memory (ROM), random access memory (RAM). In the ECU 10, for example, various functions are realized by loading a program stored in the ROM into the RAM and executing the program loaded in the RAM by the CPU. The ECU 10 may be configured with a plurality of electronic control units.

The ECU 10 is connected to a GPS receiver 1, an external sensor 2, an internal sensor 3, a map database 4, an human machine interface (HMI) 5, and an actuator 6.

The GPS receiver 1 measures a position of the host vehicle V (for example, the latitude and longitude of the host vehicle V) by receiving signals from three or more GPS satellites. The GPS receiver 1 transmits information on the measured position of the host vehicle V to the ECU 10.

The external sensor 2 is a detection device that detects a surrounding environment of the host vehicle V. The external sensor 2 includes at least one of a camera and a radar sensor.

The camera is an imaging device that images the external situation of the host vehicle V. The camera is provided on the inside of a windshield of the host vehicle V. The camera transmits the imaging information relating to the external situation of the host vehicle V to the ECU 10. The camera may be a monocular camera or may be a stereo camera. The stereo camera has two imaging units that are arranged so as to reproduce a binocular parallax. The image information of the stereo camera also includes information on the depth direction.

The radar sensor is a detection device that detects obstacles around the host vehicle V using radio waves (for example, millimeter waves) or light. The radar sensor includes, for example, at least one of the millimeter wave radar or a light detection and ranging (LIDAR). The radar sensor transmits the radio wave or light to the surroundings of the host vehicle V, and detects the obstacles by receiving radio waves or light reflected from obstacles. The radar sensor transmits the detected obstacle information to the ECU 10. The obstacles include fixed obstacles such as guard rails and buildings, as well as moving obstacles such as pedestrians, bicycles, and other vehicles.

The internal sensor 3 is a detection device that detects a traveling state of the host vehicle V. The internal sensor 3 includes a vehicle speed sensor, an accelerator sensor, and a yaw rate sensor. The vehicle speed sensor is a measuring device that measures a speed of the host vehicle V. As the vehicle speed sensor, for example, a vehicle wheel speed sensor is used, which is provided on vehicle wheels of the host vehicle V or on a drive shaft rotating integrally with vehicle wheels, and measures a rotational speed of the vehicle wheels. The vehicle speed sensor transmits the measured vehicle speed information (wheel speed information) to the ECU 10.

The accelerator sensor is a measuring device that measures an acceleration of the host vehicle V. The accelerator sensor includes, for example, a longitudinal accelerator sensor that measures acceleration in the longitudinal direction of the host vehicle V and a lateral accelerator sensor that measures a lateral acceleration of the host vehicle V. The accelerator sensor, for example, transmits the acceleration information of the host vehicle V to the ECU 10. The yaw rate sensor is a measuring device that measures a yaw rate (rotation angular velocity) around the vertical axis at the center of gravity of the host vehicle V. As the yaw rate sensor, for example, a Gyro sensor can be used. The yaw rate sensor transmits the measured yaw rate information of the host vehicle V to the ECU 10.

The map database 4 is a database that stores map information. The map database 4 is formed, for example, in a hard disk drive (HDD) mounted on the host vehicle V. The map information includes position information on the road (lane), information on the shape of the road (shape of the lane) (for example, a curve, types of straight lines, a curvature of the curve or the like), position information on the intersection, information on position of the merge point and the branch, and information on the position of buildings. The map database 4 may be stored in a server that can communicate with the host vehicle V.

Figure 2:
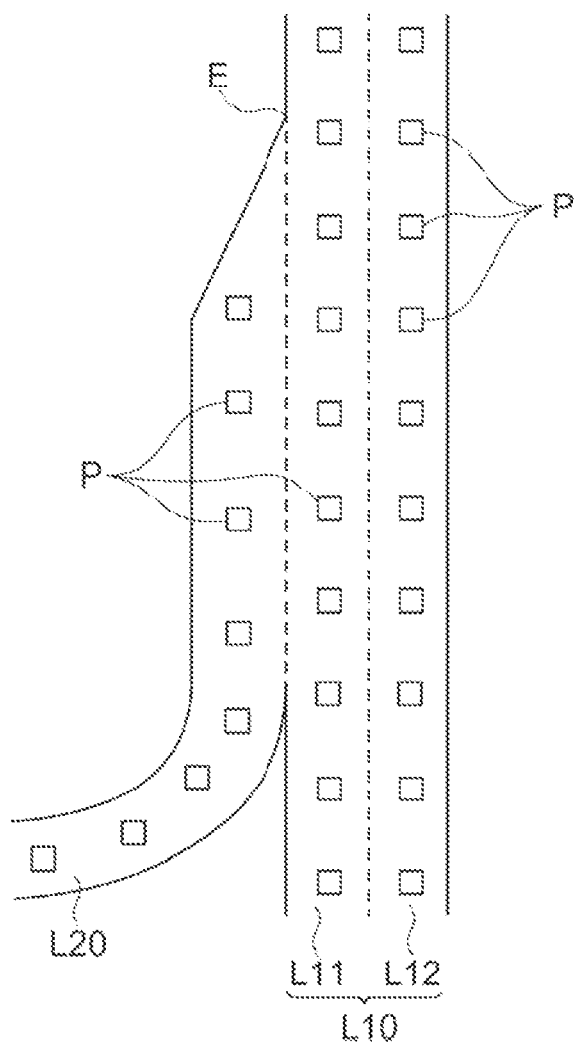
FIG. 2 is a diagram illustrating waypoints set on lanes on a map.

The map information includes information on the lanes that constitutes the road. In addition, a plurality of waypoints are set in advance on the lane included in the map information along the extending direction of the lane. These waypoints are used when a below-described target route setting unit 15 sets the target route. For example, as illustrated in FIG. 2, the waypoints P are set on each lane even at the merge point. The merging point is an area where the branch line and the main line are connected.

Specifically, when a branch line L20 merges into a main line L10 at the merge point, a plurality of waypoints P are set along the extension direction of the branch line L20 on the branch line L20. The plurality of waypoints P are set at a predetermined interval. In addition, the waypoints P are set at predetermined positions in the width direction of the branch line L20 (for example, the center positions). Here, the main line L10 is configured with a first main line L11 and a second main line L12. On the first main line L11 also, similarly to the branch line L20, a plurality of waypoints P are set along the extension direction of the first main line L11. In addition, on the second main line L12 also, similarly to the branch line L20, a plurality of waypoints P are set along the extension direction of the second main line L12.

The HMI 5 is an interface that performs inputting and outputting of the information between the autonomous driving device 100 and the driver. The HMI 5 includes, for example, a display, a speaker, and the like. The HMI 5 outputs an image on the display and outputs a voice from the speaker according to a control signal from the ECU 10. The HMI 5 also includes an input unit for the occupant to perform input operations such as an input button, a touch panel, and a voice input device.

The actuator 6 is a device used for controlling the host vehicle V. The actuator 6 includes at least a drive actuator, a brake actuator, and a steering actuator. The drive actuator controls a driving force of the host vehicle V by controlling an amount of air (throttle opening degree) supplied to the engine according to the control signal from the ECU 10. If the host vehicle V is a hybrid vehicle, in addition to the amount of air supplied to the engine, the control signal from the ECU 10 is input to a motor as a power source, and the driving force of the vehicle is controlled. If the host vehicle V is an electric vehicle, the control signal from the ECU 10 is input to a motor as a power source, and the driving force of the vehicle is controlled. The motor as the power source in these cases configures the actuator 6.

The brake actuator controls the brake system according to the control signal from the ECU 10 and controls a braking force applied to the wheels of the host vehicle V. For example, a hydraulic brake system can be used as the brake system. The steering actuator controls the driving of an assist motor controlling a steering torque of an electric power steering system according to the control signal from the ECU 10. In this way, the steering actuator controls the steering torque of the host vehicle V.

Next, a functional configuration of the ECU 10 will be described. The ECU 10 includes a vehicle position recognition unit 11, an external situation recognition unit 12, a travel state recognition unit 13, a merge determination unit 14, a target route setting unit 15, a travel plan generation unit 16, and a vehicle control unit 17. A part of the functions of the ECU 10 may be performed by a server capable of communicating with the host vehicle V.

The vehicle position recognition unit 11 recognizes a position of the host vehicle V on the map based on the position information from the GPS receiver 1 and the map information in the map database 4. In addition, the vehicle position recognition unit 11 recognizes position information on the fixed obstacles such as electric poles included in the map information in the map database 4 and the position of the host vehicle V using the result of detection performed by the external sensor 2 using the simultaneous localization and mapping (SLAM) technology. The vehicle position recognition unit 11 may recognize the position of the vehicle on the map using a known method.

The external situation recognition unit 12 recognizes the external situation around the host vehicle V based on the result of detection performed by the external sensor 2. The external situation includes the positions of the obstacles with respect to the host vehicle V, relative speeds of obstacles with respect to the host vehicle V, and the moving direction of the obstacles with respect to the host vehicle V. The obstacles also include other vehicles that travel on the main line to which the branch line merges when the host vehicle V travels on the branch line at the merge point. That is, the external situation recognized by the external situation recognition unit 12 includes the travel situation of other vehicles that travel on the main line around the host vehicle V, if the host vehicle V is traveling on the branch line. The external situation recognition unit 12 recognizes the external situation of the host vehicle V using known methods based on at least one of the image captured by the camera and the obstacle information from the radar sensor.

The travel state recognition unit 13 recognizes the travel state of the vehicle based on the result of measurement performed by the internal sensor 3. The travel state includes the speed of the vehicle, the acceleration of the vehicle, and the yaw rate of the vehicle. Specifically, the travel state recognition unit 13 recognizes the speed of the vehicle based on the vehicle speed information from the vehicle speed sensor. The travel state recognition unit 13 recognizes the acceleration of the vehicle based on the vehicle speed information from the accelerator sensor. The travel state recognition unit 13 recognizes the direction of the vehicle based on the yaw rate information from the yaw rate sensor.

The merge determination unit 14 determines whether or not the merge into the main line from the branch line is easy if the host vehicle V merges into the main line from the branch line at the merge point. The merge determination unit 14 performs the determination whether or not the merge is easy when the host vehicle V reaches the merge point. The merge determination unit 14 may determine whether or not the merge is easy when the host vehicle V reaches a position where a distance to the merge point is within a predetermined distance. Here, the merge determination unit 14 recognizes whether or not the host vehicle V reaches the merge point based on, for example, the position information of the host vehicle V recognized by the vehicle position recognition unit 11 and the map information in the map database 4.

The merge determination unit 14 determines whether or not the merge into the main line from the branch line is easy based on the travel situation of another vehicle V1 traveling on the main line recognized by the external situation recognition unit 12 according to determination criteria set in advance. This determination criteria is set in advance in the merge determination unit 14.

Hereinafter, various specific examples of determining whether or not the merge is easy will be described explained. Here, as illustrated in FIG. 2, a case where the host vehicle V merges into the first main line L11 from the branch line L20 will be described as an example.

For example, as a first determination method, the merge determination unit 14 can perform the determination whether or not the merge is easy according to the determination criteria set in advance based on a degree of congestion of the other vehicle traveling on the first main line L11. The determination criteria set in advance here means that it is determine that the merge is not easy if the degree of congestion is equal to or greater than a determination criteria value used for the degree of congestion, and it is determined that the merge is easy if the degree of congestion is smaller than the determination criteria value used for the degree of congestion.

Specifically, the merge determination unit 14 recognizes the degree of congestion (density) of the other vehicle traveling on the first main line L11 based on the position of the other vehicle recognized by the external situation recognition unit 12. The merge determination unit 14 determines that the merge is not easy if the recognized degree of congestion is equal to or greater than the determination criteria value used for the degree of congestion. The merge determination unit 14 determines that the merge is easy if the recognized degree of congestion is smaller than the determination criteria value used for the degree of congestion.

For example, as a second determination method, the merge determination unit 14 can determine whether or not the merge is easy according to a determination criteria set in advance based on a free space on the first main line L11. The free space on the first main line L11 is a free space at the merge point on the first main line L11 existing around the host vehicle V traveling on the branch line L20. The determination criteria set in advance here means that it is determine that the merge is not easy if a width (length of the first main line L11 in the extending direction) of the free space is less than a determination criteria value used for the free space, and it is determined that the merge is easy if the width of the free space is equal to or greater than the determination criteria value used for the free space.

Specifically, the merge determination unit 14 recognizes the free space on the first main line L11 based on the position of the other vehicle recognized by the external situation recognition unit 12. The merge determination unit 14 determines that the merge is not easy if the width of the recognized free space (the length of the first main line L11 in the extending direction) is less than the determination criteria value used for the free space. The merge determination unit 14 determines that the merge is easy if the width of the recognized free space (the length of the first main line L11 in the extending direction) is equal to or greater than the determination criteria value used for the free space.

Even if it is determined in the second determination method that the free space having the width greater than the determination criteria value exists on the first main line L11, as a third determination method, the merge determination unit 14 may further determine whether or not the merge is easy based on the travel situation of other vehicles. Here, the merge determination unit 14 determines whether or not the merge is easy according to a determination condition set in advance based on a relative speed between the other vehicle traveling on the first main line L11 at the merge point and the host vehicle V traveling on the branch line L20.

The determination condition set in advance here means that it is determined that the merge is not easy if the relative speed between the other vehicle traveling on the first main line L11 and the host vehicle V is equal to or higher than the determination criteria value used for the relative speed, and it is determined that the merge is easy if the relative speed between the other vehicle traveling on the first main line L11 and the host vehicle V is lower than the determination criteria value used for relative speed.

Specifically, the merge determination unit 14 recognizes the relative speed between the other vehicle traveling on the first main line L11 at the merge point and the host vehicle V based on the result recognition performed by the external situation recognition unit 12. The merge determination unit 14 determines that the merge is not easy if the recognized relative speed is equal to or higher than the determination criteria value used for relative speed. The merge determination unit 14 determines that the merge is easy if the recognized relative speed is lower than the determination criteria value used for relative speed. If there are a plurality of other vehicles traveling on the first main line L11, the merge determination unit 14 may use an average value of the relative speeds for the determination, or may use the relative speed between the host vehicle V and another vehicle selected based on a predetermined condition for the determination.

For example, as a fourth determination method, even if it is determined in the second determination method that the free space having the width greater than the determination criteria value exists on the first main line L11, the merge determination unit 14 may further determine whether or not the merge is easy based on the travel situation of the other vehicle. Here, the merge determination unit 14 determines whether or not merge is easy according to a preset determination condition based on the speed of other vehicles traveling on the first main line L 11 at the merge point.

The determination condition set in advance here means that, for example, it is determined that the merge is not easy if the speed of the other vehicle traveling on the first main line L11 is lower than the speed of the host vehicle V, and it is determined that the merge is easy if the speed of the other vehicle traveling on the first main line L11 is higher than the speed of the host vehicle V. The case where the speed of the other vehicle traveling on the first main line L11 is lower than the speed of the host vehicle V means the case where the host vehicle V needs to decelerate when the host vehicle V merges into the first main line L11.

Specifically, the merge determination unit 14 recognizes the speed of the other vehicle traveling on the first main line L11 at the merging point based on the result of recognition performed by the external situation recognition unit 12. The merge determination unit 14 determines that the merge is not easy if the recognized speed of the other vehicles is lower than the speed of the host vehicle V recognized by the travel state recognition unit 13. The merge determination unit 14 determines that the merge is easy if the recognized speed of the other vehicle is equal to or higher than the speed of the host vehicle V recognized by the travel state recognition unit 13. If there are a plurality of other vehicles, the merge determination unit 14 may use the speeds of other vehicles selected based on the predetermined condition for the determination.

For example, as a fifth determination method, the merge determination unit 14 can perform the determination whether or not the merge is easy according to the determination criteria set in advance based on the travel situation of other vehicles traveling on the first main line L11 and the normal target route. The normal target route here means a target route set by the target route setting unit 15 which will be described in detail later, and is a target route at the time of merging into the first main line L11 from the branch line L20. The determination criteria set in advance here means that it is determined that the merge is not easy if it is predicted that the merge into the first main line L11 from the branch line L20 is difficult or that the merge cannot be performed when the host vehicle V travels along the normal target route due to the relationship with the travel situation of other vehicles. In addition, the determination criteria set in advance here means that it is determined that the merge is easy if it is predicted that the merge into the first main line L11 from the branch line L20 can be performed when the host vehicle V travels along the normal target route due to the relationship with the travel situation of other vehicles.

For example, even if the free space exists on the first main line L11 under the situation that the host vehicle V travels on the branch line L20, depending on the position of the other vehicle (due to a fact that the other vehicle obstruct the traveling of the host vehicle V), in some cases, the host vehicle V cannot enter the free space if the host vehicle V travels along the normal target route. As described above, the merge determination unit 14 predicts whether or not the host vehicle V can merge into the first main line L11 when the host vehicle V autonomously travels along the normal target route, based on the travel situation of the other vehicle traveling on the main line L11 recognized by the external situation recognition unit 12 and the normal target route. The merge determination unit 14 determines that merge is not easy if it is predicted that the host vehicle V cannot merge into the first main line L11 or the merge is difficult. The merge determination unit 14 determines that merge is easy if it is predicted that the host vehicle V can merge into the first main line L11.

The merge determination unit 14 may determine whether or not the merge is easy by combining at least two of the first to fifth determination methods described above.

The target route setting unit 15 sets the target route based on the map information in the map database 4, the position of the host vehicle V recognized by the vehicle position recognition unit 11, and the destination set in advance. The target route is a route from the current position of the host vehicle V on the map to the destination. The destination may be a destination set by the occupant or may be a destination autonomously set by the autonomous driving device 100 using a well-known method (destination estimation processing or the like).

In this case, the target route setting unit 15 selects a waypoint to pass through when traveling toward the destination among the waypoints set on the lane in the map information. The target route setting unit 15 sets the target route such that the host vehicle V passes through the selected waypoint. That is, the target route setting unit 15 sets the target route by connecting the selected waypoints.

Figure 3:
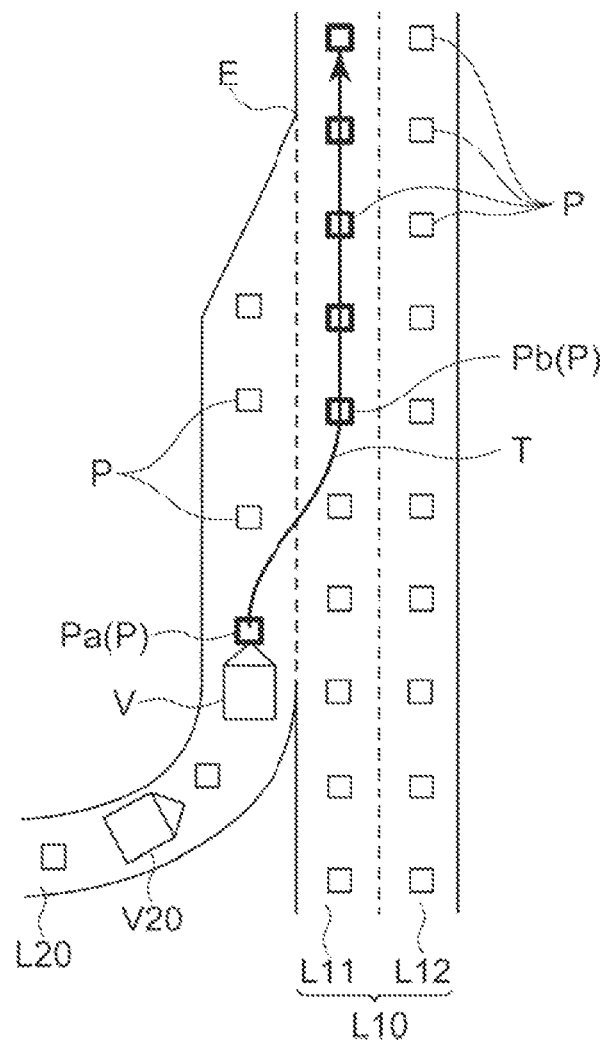
FIG. 3 is a diagram illustrating a target route on the map when merging into the main line is easy.

A target route that causes the host vehicle V to merge into the main line from the branch line towards the destination set in advance is included in this target route. When setting the target route for the host vehicle V to merge into the main line from the branch line, the target route setting unit 15 sets target routes different from each other in a case where it is determined by the merge determination unit 14 that the merge is easy and in a case where it is determined that the merge is not easy. Hereinafter, a specific example of the target route for merging into the main line from the branch line will be described. Here, as illustrated in FIG. 3, the case where the host vehicle V merges into the first main line L11 from the branch line L20 will be described as an example.

The target route setting unit 15 sets the normal target route or the target route for the time when the merge is not easy as the target route. First, the normal target route set by the target route setting unit 15 will be described. If it is determined by the merge determination unit 14 that the merge is easy, the target route setting unit 15 sets a normal target route T. Specifically, the target route setting unit 15 select the waypoints P to pass through when the host vehicle V merges into the first main line L11 from the branch line L20 toward the destination among the waypoints P set on the branch line L20 and the first main line L11 in the map information. The target route setting unit 15 sets the normal target route T by connecting the selected waypoints P. The target route setting unit 15 can set the target route T by a well-known method using the waypoints P. In FIG. 3, the waypoints P selected for setting the normal target route T are indicated by bold rectangles.

A waypoint P closest to the end edge E side on the branch line L20, which is selected from the waypoints P on the branch line L20 to set the normal target route T, is set as an end edge waypoint Pa. In an example illustrated in FIG. 3, the waypoint P at immediately in front of the position of the host vehicle V on the map is the end edge waypoint Pa. That is, in the example illustrated in FIG. 3, the end edge waypoint Pa becomes the target route for the host vehicle V to quickly merge into the first main line L11 after the host vehicle V reaches the merging point. In addition, a waypoint P connected to the end edge waypoint Pa, which is selected from the waypoints P to be selected for setting the normal target route T on the first main line L11, is set as a start edge waypoint Pb. In order to suppress a sudden behavior change of host vehicle V at the time of merging into first main line L11 from the branch line L20, the target route setting unit 15 can select the start edge waypoint Pb based on a well-known method.

Figure 4:
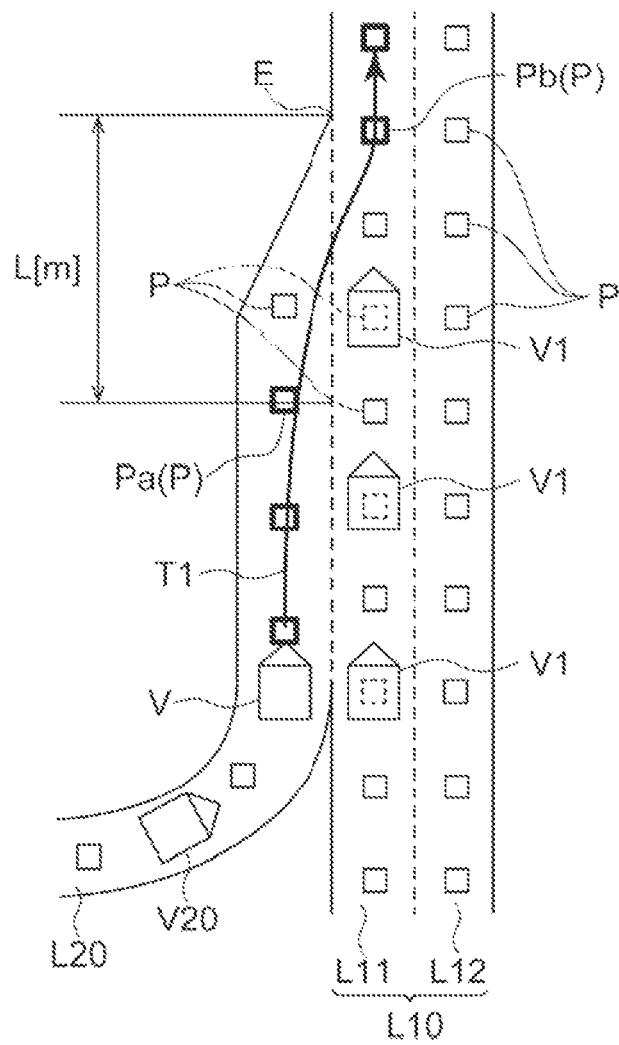
FIG. 4 is a diagram illustrating a target route on the map when merging into the main line is not easy.

In addition, if the merge determination unit 14 determines that the merge is not easy, the target route setting unit 15 sets the target route for the time when the merge is not easy. Specifically, the target route setting unit 15 selects a waypoint P from the waypoints P set on the branch line L20 and the first main line L11 in the map information as illustrated in FIG. 4 for the host vehicle V to pass through when merging into the first main line L11 from the branch line L20 toward the destination. However, as the end edge waypoint Pa on the branch line L20 to be selected to set the route T1 for the time when the merge is not easy, the target route setting unit 15 selects a waypoint P set at the position at the end edge E side of the branch line L20 compared to the case where it is determined that the merge is easy. That is, the target route setting unit 15 changes the waypoint P to be selected as the end edge waypoint Pa based on the result of determination performed by the merge determination unit 14. The target route setting unit 15 sets the target route T1 for the time when the merge is not easy by connecting the selected waypoints P.

Here, the target route setting unit 15 selects the waypoint P existing at a position separated by a distance L from the end edge E on the branch line L20 as the end edge waypoint Pa for setting the target route T1 for the time when the merge is not easy. The target route setting unit 15 may use a constant value as the distance L or may change the distance L based on a predetermined condition.

Hereinafter, various examples for the target route setting unit 15 to change the distance L for selecting the end edge waypoint Pa will be described.

For example, the target route setting unit 15 can determine the distance L based on a vehicle size of the host vehicle V. The vehicle size is classified by types such as a motorcycle, a passenger car, and a truck. The vehicle size becomes larger in an order of the motorcycle, the passenger car, and the truck. Specifically, the target route setting unit 15 sets the distance L to be short if the vehicle size of the host vehicle V is small compared to a case where the vehicle size of the host vehicle V is large. That is, if the vehicle size of the host vehicle V is small, the target route setting unit 15 sets the waypoint P closer to the end edge E side of the branch line L20 as the end edge waypoint Pa compared to the case where the vehicle size of the host vehicle V is large.

For example, the target route setting unit 15 can determine the distance L based on the vehicle size of another vehicle V1 traveling on the first main line L11. Another vehicle V1 traveling on the first main line L11 means another vehicle V1 that obstructs the traveling of the host vehicle V or another vehicle V1 around the host vehicle V when the host vehicle V merges into the first main line L11 along the target route. For example, another vehicle V1 traveling on the first main line L11 means another vehicle V1 that obstructs the traveling of the host vehicle V or another vehicle V1 around the host vehicle V when the host vehicle V merges into the first main line L11 along the initial target route set in advance. For example, the initial target route may be set a waypoint P at a position separated by a reference distance set in advance from the end edge E on the branch line L20 as an end edge waypoint Pa. The end edge waypoint Pa in the initial target route is positioned at the position closer to the end edge E side of the branch line L20 than the end edge waypoint Pa in the normal target route T. Another vehicle V1 specified by a method other than a method using the initial target route may be used as another vehicle V1 traveling on the first main line L11.

Specifically, if the vehicle size of the other vehicle V1 traveling on the first main line L11 is small, the target route setting unit 15 sets the distance L to be short compared to a case where the vehicle size of another vehicle V1 traveling on the first main line L11 is large. That is, if the vehicle size of another vehicle V1 traveling on the first main line L11 is small, the target route setting unit 15 selects the waypoint P positioned closer to the end edge E side of the branch line L20 as the end edge waypoint Pa compared to the case where the vehicle size of the other vehicle V1 traveling on the first main line L11 is large.

For example, the target route setting unit 15 can determine the distance L based on the speed of the other vehicle V1 traveling on the first main line L11. Specifically, if the speed of the other vehicle V1 traveling on the first main line L11 is high, the target route setting unit 15 sets the distance L to be less compared to the case where the speed of the other vehicle V1 traveling on the first main line L11 is low. That is, if the speed of the other vehicle V1 traveling on the first main line L11 is high, the target route setting unit 15 selects the waypoint P positioned closer to the end edge E side of branch line L20 as end edge waypoints Pa compared to the case where the speed of the other vehicle V1 traveling on the first main line L11 is low.

The target route setting unit 15 may use any one method or a combination of two or more of the three methods (the method using the vehicle size of another vehicle V1, a method using the speed of another vehicle V1, a method using the vehicle size of the host vehicle V) for determining the distance L described above.

Figure 6:
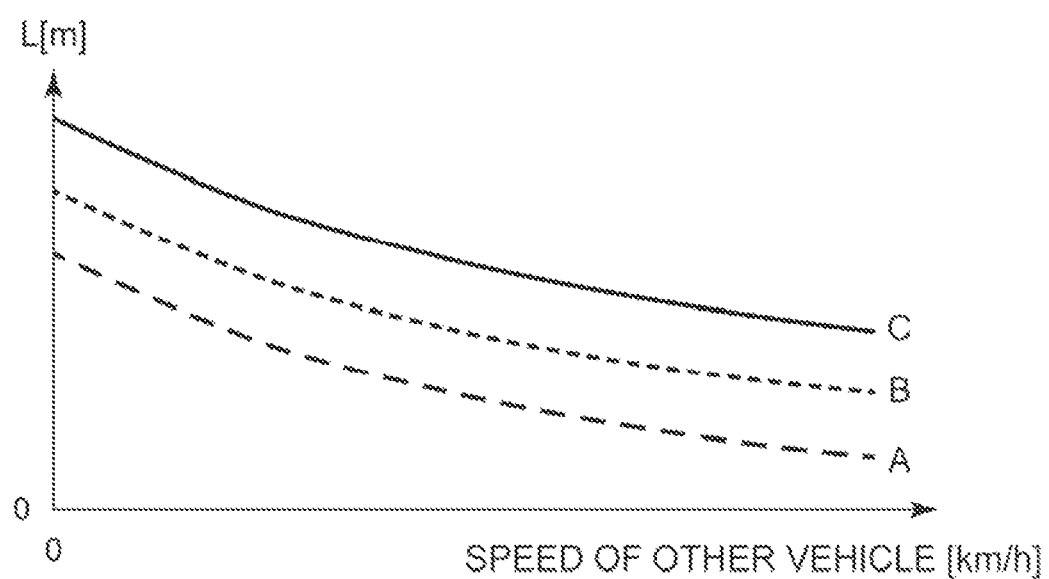
FIG. 6 is a graph for selecting the waypoint at an end edge portion of the branch line based on the vehicle size and a speed of other vehicles.

Specifically, if the combination of all the three methods for determining the distance L is used, the target route setting unit 15 can determine the distance L using the classification table illustrated in FIG. 5 and the graph illustrated in FIG. 6. In this case, first, The target route setting unit 15 selects a class that corresponds to the vehicle size of the host vehicle V and the vehicle size of the other vehicle V1 traveling on the first main line L11 from "A" to "C" using the classification table illustrated in FIG. 5. Next, the target route setting unit 15 selects a graph corresponding to the class selected using the classification table in FIG. 5 from the graphs "A" to "C" illustrated in FIG. 6. The target route setting unit 15 can determine the distance L based on the selected graph and the speed of the other vehicle V1 traveling on the first main line L 11.

If it is determined by the merge determination unit 14 that the merge is not easy, the target route setting unit 15 sets the target route T1 for the time when the merge is not easy. On the other hand, if it is determined by the merge determination unit 14 that merge is easy, the target route setting unit 15 sets the normal target route T. The target route T1 for the time when the merge is not easy is a path for the host vehicle V to merge into the first main line L11 after traveling closer to the end edge E side of the branch line L20 compared to the normal target route T.

If the merge determination unit 14 determines whether the merge is easy or not using the fifth determination method, the target route setting unit 15 tentatively generates a normal target route T when the host vehicle V reaches the merging point (or approaches the merging point). The merge determination unit 14 determines whether or not the merge is easy based on the normal target route T tentatively generated by the target route setting unit 15. The target route setting unit 15 may generate the normal target route T or the target route T1 for the time when the merge is not easy based on the result of determination performed by the merge determination unit 14.

The travel plan generation unit 16 generates the travel plan of the host vehicle V based on the target route set by the target route setting unit 15, the map information in the map database 4, the position of the host vehicle V on the map recognized by the vehicle position recognition unit 11, the external situation of the host vehicle V recognized by the external situation recognition unit 12, and the travel state of the vehicle recognized by the travel state recognition unit 13. This travel plan is a travel plan for causing the host vehicle V to autonomously travel along the target route set by the target route setting unit 15.

The travel plan includes a speed plan and a steering plan. The speed plan includes a control target value (for example, a target vehicle speed and a target acceleration or deceleration) of the host vehicle V according to a position on the target route of host vehicle V. The position on the target route is the position on the map in the extending direction of the target route. The position on the target route means a vertical set position set at a predetermined interval (for example, 1 m) each in the extending direction of the target route. The control target value is set in association with each vertical set position on the target route. The travel plan generation unit 16 sets the vertical set position on the target route at a predetermined interval, and generates the speed plan in the travel plan by setting the control target value for each vertical set position. The travel plan generation unit 16 generates the steering plan in the travel plan by setting a target trajectory of the travel of the host vehicle V using a well-known method.

The vehicle control unit 17 performs the autonomous driving control for the vehicle based on the travel plan generated by the travel plan generation unit 16. The vehicle control unit 17 performs the autonomous driving control for the vehicle by transmitting a control signal to the actuator 6. That is, the vehicle control unit 17 causes the host vehicle V to autonomously travel based on the travel plan along the target route set by the target route setting unit 15.

Figure 7:
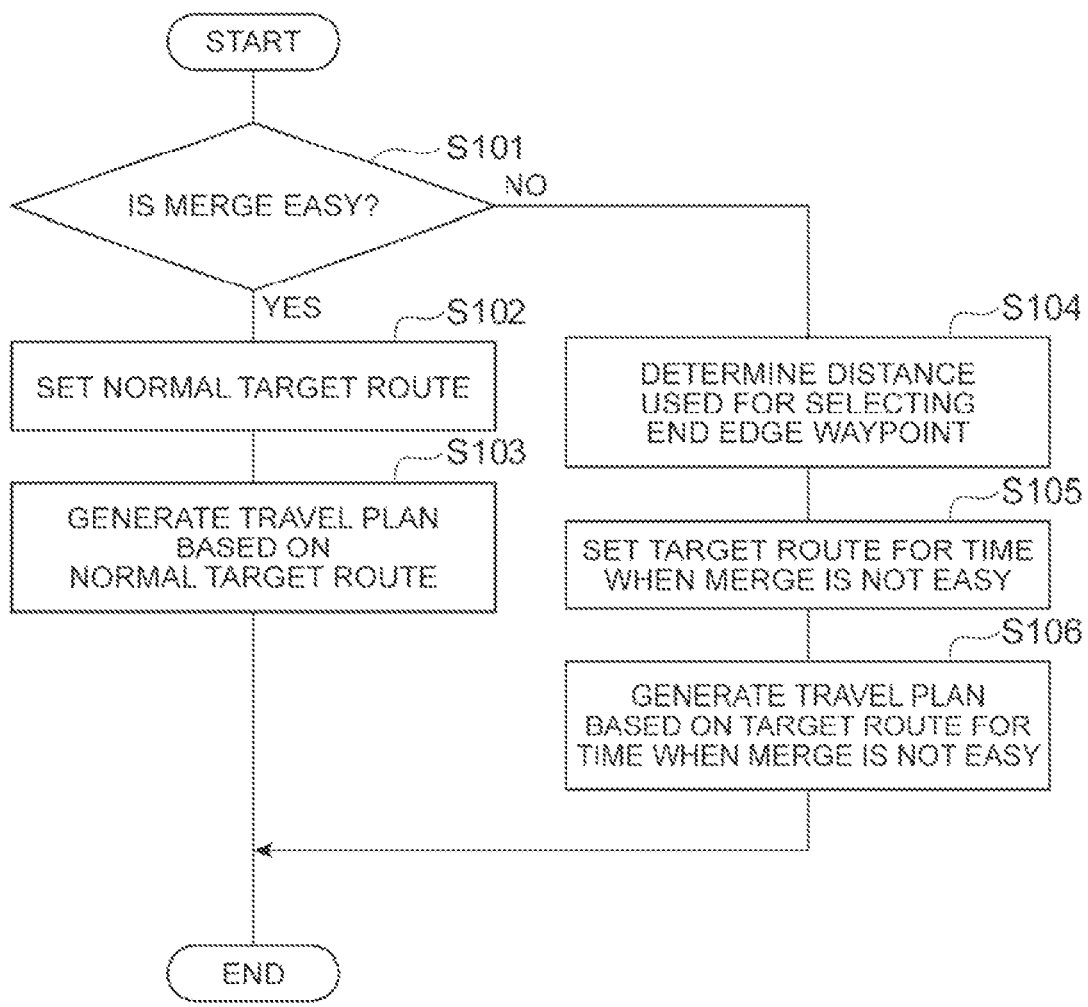
FIG. 7 is a flowchart illustrating a flow of processing for generating the target route and a travel plan for causing the host vehicle to merge into the main line from the branch line.

Next, a flow of processing for generating the target route and the travel plan for causing the host vehicle V to merge into the main line from the branch line will be described. The processing in the flowchart illustrated in FIG. 7 starts when the host vehicle V traveling on the branch line reaches the merging point (or approaches the merging point within a predetermined distance). In addition, the execution of the processing illustrated in FIG. 7 is repeated to start at a predetermined time interval. The vehicle control unit 17 controls the travel of the host vehicle V based on a new travel plan generated at each time by the travel plan generation unit 16.

As illustrated in FIG. 7, when the host vehicle V reaches the merging point, the merge determination unit 14 determines whether or not merge into the main line is easy (S101). If the merge is easy (YES in S101), the target route setting unit 15 sets a normal target route as the target route (S102). The travel plan generation unit 16 generates a travel plan based on the normal target route set by the target route setting unit 15 (S103). When the travel plan is generated, the vehicle control unit 17 controls the travel of the host vehicle V based on the newly generated travel plan.

If it is determined that the merge is not easy (NO in S101) in S101, the target route setting unit 15 determines the distance L used for selecting the end edge waypoint Pa (S104). After the distance L is determined, the target route setting unit 15 determines the waypoint P set at the position separated from the end edge by the distance L on the branch line as the end edge waypoint Pa. The target route setting unit 15 sets the target route for the time when the merge is not easy such that the host vehicle V passes through the end edge waypoint Pa (S105). The travel plan generation unit 16 generates a travel plan based on the target route for the time when the merge is not easy to set by the target route setting unit 15 (S106). The vehicle control unit 17 controls the travel of the host vehicle V based on the newly generated travel plan.

As described above, in the autonomous driving device 100, for example, if it is not easy for the host vehicle V traveling on the branch line L20 to merge into the first main line L11 at the merging point illustrated in FIG. 2, a target route T1 for the time when the merge is not easy (refer to FIG. 4) is set, which causes the host vehicle V to merge into the first main line L11 after traveling to the position closer to the end edge E on the branch line L20 compared to a case where the merge is easy. That is, if the merge to the first main line L11 is not easy, the autonomous driving device 100 causes the host vehicle V to travel to a position closer to the end edge E on the branch line L20 compared to the case where the merge is easy. In this way, a space can be provided behind the host vehicle V on the branch line L20. A following vehicle traveling behind the host vehicle V on the branch line L20 can travel to the end of the branch line L20 (end edge E side) while traveling in the space provided behind the host vehicle V on the branch line L20. Therefore, even if the merge into the first main line L11 is not easy, the autonomous driving device 100 can suppress the congestion due to the following vehicles traveling on the branch line L20.

In addition, since the host vehicle V merges into the first main line L11 after traveling to the end edge E side on the branch line L20, it is possible to prevent the following vehicle traveling on the branch line L20 from passing through the left side of the host vehicle V to overtake when the host vehicle V merges into first main line L11. Therefore, the autonomous driving device 100 can reduce the necessity of considering the following vehicle which passes through the left side of the host vehicle V when the host vehicle V autonomously travels. In addition, since the host vehicle V merges at the back of the first main line L11 (the side closer to the end edge E on the branch line L20), the autonomous driving device 100 can reduce the necessity of considering other vehicles merged from the branch line L20 after the host vehicle V merges into the first main line L11.

The autonomous driving device 100 changes the position of the end edge waypoint Pa when setting the target route T1 for the time when the merge is not easy based on various conditions. For example, if the vehicle size of the host vehicle V is small, the target route setting unit 15 of the autonomous driving device 100 selects the waypoint P set at the position of the end edge E side on the branch line L20 as the end edge waypoint Pa compared to the case where the vehicle size of the host vehicle V is large. That is, if the vehicle size of the host vehicle V is small, the autonomous driving device 100 can cause the host vehicle V to travel to a position closer to the end edge E on the branch line L20 compared to the case where the vehicle size of the host vehicle V is large. As described above, the autonomous driving device 100 can change the distance for traveling on the branch line L20 according to the vehicle size of the host vehicle V.

For example, if the vehicle size of another vehicle V1 traveling on the first main line L11 is small, the target route setting unit 15 of the autonomous driving device 100 selects the waypoint P set at the position closer to the end edge E side of the branch line L20 as the end edge waypoint Pa compared to the case where the vehicle size of the other vehicle V1 is large. That is, if the vehicle size of the other vehicle V1 traveling on the first main line L11 is small, the autonomous driving device 100 can cause the host vehicle V to travel to a position closer to the end edge E on the branch line L 20 compared to the case where the vehicle size of the other vehicle V1 is large. As described above, the autonomous driving device 100 can change the traveling distance on the branch line L20 according to the vehicle size of the other vehicle V1.

for example, if the speed of another vehicle V1 traveling on the first main line L11 is high, the target route setting unit 15 of the autonomous driving device 100 selects the waypoint P set at the position closer to the end edge E side of the branch line L20 as the end edge waypoint Pa compared to the case where the speed of the other vehicle V1 is low. That is, if the speed of the other vehicle V1 traveling on the first main line L11 is high, the autonomous driving device 100 can cause the host vehicle V to travel to a position closer to the end edge E on the branch line L20 compared to the case where the speed of the other vehicle V1 is low. As described above, the autonomous driving device 100 can change the traveling distance on the branch line L20 according to the speed of the other vehicle V1. For example, if the speed of the other vehicle V1 is high, the distance for the host vehicle V to travel on the branch line L20 becomes long. In this case, the autonomous driving device 100 can appropriately accelerate the host vehicle V up to, for example, the speed of the other vehicle V1.

As described above, an embodiment of the present disclosure has been described, however, the present disclosure is not limited to the embodiment described above. For example, the road shape of the merging point described with reference to FIGS. 2 to 4 is merely an example, and is not limited to the road shape having such a merging point.

What is claimed is:
1. An autonomous driving device comprising:
a processor configured to:
set a first target route for a host vehicle to merge into a main line from a branch line toward a destination set in advance;
recognize a position of a host vehicle on a map;

determine whether a merge point has been reached by the host vehicle while the host vehicle is traveling on the branch line of the merge point based on the position of the host vehicle and map information;

recognize a density of vehicles of the main line based on an external sensor;

determine whether or not the density recognized is equal to or greater than a density threshold set in advance;

control the host vehicle to travel along the first target route based on the density of vehicles of the main line determined being less than the density threshold set in advance; and control the host vehicle to travel along a second target route based on the density of vehicles of the main line determined being equal to or greater than the density threshold set in advance, wherein the second target route passes through a waypoint closer to an end edge side of the branch line than the first target route.

2. The autonomous driving device according to claim 1, wherein the processor is configured to:

recognize whether a size of the host vehicle is a first size or a second size greater than the first size;

control the host vehicle to travel along the second target route for the second size in a case where the density of the vehicles of the main line determined is equal to or greater than the density threshold set in advance and the host vehicle is the second size; and control the host vehicle to travel along the second target route for the first size in a case where the density of the vehicles of the main line determined is equal to or greater than the density threshold set in advance and the host vehicle is the first size, and the second target route for the first size passes through the waypoint closer to the end edge side of the branch line than the second target route for the second size.

3. The autonomous driving device according to claim 2, wherein the processor is configured to:

determine that the host vehicle is the first size in a case where the host vehicle is a motorcycle or a car.

4. An autonomous driving method comprising:

setting a first target route for a host vehicle to merge into a main line from a branch line toward a destination set in advance;

recognizing a position of a host vehicle on a map;

determining whether a merge point has been reached by the host vehicle while the host vehicle is traveling on the branch line of the merge point based on the position of the host vehicle and map information;

recognizing a density of vehicles of the main line based on an external sensor;

determining whether or not the density recognized is equal to or greater than a density threshold set in advance;

controlling the host vehicle to travel along the first target route based on the density of vehicles of the main line determined being less than the density threshold set in advance; and controlling the host vehicle to travel along a second target route based on the density of vehicles of the main line determined being equal to or greater than the density threshold set in advance, wherein the second target route passes through a waypoint closer to an end edge side of the branch line than the first target route.

5. The autonomous driving method according to claim 4, further comprising:

recognizing whether a size of the host vehicle is a first size or a second size greater than the first size;

controlling the host vehicle to travel along the second target route for the second size in a case where the density of the vehicles of the main line determined is equal to or greater than the density threshold set in advance and the host vehicle is the second size; and controlling the host vehicle to travel along the second target route for the first size in a case where the density of the vehicles of the main line determined is equal to or greater than the density threshold set in advance and the host vehicle is the first size, wherein the second target route for the first size passes through the waypoint closer to the end edge side of the branch line than the second target route for the second size.

6. The autonomous driving method according to claim 5, further comprising:

determining that the host vehicle is the first size in a case where the host vehicle is a motorcycle or a car.

7. A non-transitory computer-readable storage medium storing a program for causing a computer to execute processing comprises:

setting a first target route for a host vehicle to merge into a main line from a branch line toward a destination set in advance;

identifying a position of a host vehicle on a map;

determining whether a merge point has been reached by the host vehicle while the host vehicle is traveling on the branch line of the merge point based on the position of the host vehicle and map information;

identifying a density of vehicles of the main line based on an external sensor;

determining whether or not the density recognized is equal to or greater than a density threshold set in advance;

controlling the host vehicle to travel along the first target route based on the density of vehicles of the main line determined being less than the density threshold set in advance; and controlling the host vehicle to travel along a second target route based on the density of vehicles of the main line determined being equal to or greater than the density threshold set in advance, wherein the second target route passes through a waypoint closer to an end edge side of the branch line than the first target route.

8. The non-transitory computer-readable storage medium according to claim 7, wherein the processing further comprises:

identifying whether a size of the host vehicle is a first size or a second size greater than the first size;

controlling the host vehicle to travel along the second target route for the second size in a case where the density of the vehicles of the main line determined is equal to or greater than the density threshold set in advance and the host vehicle is the second size; and controlling the host vehicle to travel along the second target route for the first size in a case where the density of the vehicles of the main line determined is equal to or greater than the density threshold set in advance and the host vehicle is the first size, wherein the second target route for the first size passes through the waypoint closer to the end edge side of the branch line than the second target route for the second size.

9. The non-transitory computer-readable storage medium according to claim 8, where in the processing further comprises:
   determining that the host vehicle is the first size in a case where the host vehicle is a motorcycle or a car.

* * * * *